United States Patent Office 3,447,911
Patented June 3, 1969

3,447,911
PREPARATION OF SOLID, DRY HYDRAZINE REACTANT AND METHOD FOR PREPARATION OF CYCLOHEPTASULFIMIDE
Henri Garcia, Bagneux, France, assignor to Centre National de la Recherche Scientifique (French Government Administration), Paris, France
No Drawing. Filed Dec. 27, 1965, Ser. No. 516,710
Claims priority, application France, Jan. 6, 1965, 962
Int. Cl. C01b 21/54
U.S. Cl. 23—357                    4 Claims

ABSTRACT OF THE DISCLOSURE

The invention relates to a process for making cycloheptasulfimide $S_7NH$ which comprises reacting nitrogen sulfide or a thiotrithiazyl halide with a hydrazine reactant in an inert solvent sheltered from water. In another aspect, the invention relates to the preparation of a solid, dry hydrazine reactant by absorbing a hyrazine hydrate on a water-retaining porous support such as an activated silica gel.

---

This invention relates to methods using hydrazine for producing chemicals in a reduced state, in particular cycloheptasulfimide.

Cycloheptasulfimide $S_7NH$ is already known, its molecule consisting of an octogonal heterocycle deriving from the $S_8$ sulfur cycle, in which an NH group is substituted for an S atom.

Cycloheptasulfimide exerts a powerful fungicide effect with respect to plants, yet it is only very slightly toxic for the higher organisms. On the other hand, known methods of preparing cycloheptasulfimide enable only traces of this chemical to be obtained and cannot therefore be exploited on an industrial scale.

It is accordingly the primary object of this invention to provide methods which meet practical requirements to a greater dergee than heretofore, especially inasmuch as they enable cycloheptasulfimide to be prepared in large quantities under satisfactory conditions of purity and efficiency, using relatively inexpensive starting materials.

In accordance with a specific provision of the invention, cycloheptasulfimide is prepared by reacting nitrogen sulfide $S_4N_4$ or a thiotrithiazyl halide, and preferably thiotrithiazyl chloride, with hydrazine, in an inert organic solvent, sheltered from water.

The invention relates to a number of other provisions which are preferably used jointly but which may be used singly if necessary, and most notably to a second provision in accordance with which a hydrazine hydrate is absorbed on an activated silica gel, or on a support having similar properties, whereby a reactant is formed which is capable of liberating the hydrazine in a reaction medium while keeping the hydrating water of the initial hydrazine hydrate fixed.

Assuming that it is desired to prepare cycloheptasulfimide through the action of hydrazine on nitrogen sulfide $S_4N_4$ or on thiotrithiazyl chloride $S_4N_3Cl$, then the procedure according to a preferred embodiment of the invention is as follows or similar thereto.

Before going into greater detail, it is thought to be necessary to cite patent application Ser. No. 299,836 filed Aug. 5, 1963 now U.S. Patent No. 3,326,643, which describes methods of preparing nitrogen sulfide $S_4N_4$ and thiotrithiazyl chloride $ClS_4N_3$, these two substances being the preferred starting materials for preparing cycloheptasulfimide in accordance with the method of the present invention. Hydrogen sulfide $S_4N_4$ can readily be prepared by the action, in the cold condition, of excess ammonia on sulfur chloride in solution in a cyclohexane, on the basis of the following reaction:

(1)    $16NH_3 + 6Cl_2S_2 \rightarrow 12ClNH_4 + 8S + S_4N_4$

The ammonium chloride and the sulfur formed in the reaction precipitate, giving a solution of nitrogen sulfide in cyclohexane.

Thiotrithiazyl chloride can be formed in turn by the action under heat of excess sulfur chloride on a solution of nitrogen sulfide in cyclohexane for example, by the following reaction:

(2)    $3S_4N_4 + 2Cl_2S_2 \rightarrow 4S_4N_3Cl$

In accordance with the first provision of the invention, either of these starting materials is caused to react in an inert organic solvent and sheltered from water, with a very powerful reducing agent and preferably with hydrazine.

It was unforeseen that cycloheptasulfimide could be obtained with a highly satisfactory yield (as will be apparent from the examples given hereinafter by way of illustration) by the action of hydrazine, on nitrogen sulfide $S_4N_4$ and thiotrithiazyl chloride, sheltered from any hydrating water which might be present.

Tests conducted with other reducing agents such as palladium hydride, Raney nickel, sodium borohydride and hypophosphoric acid also led to the formation of more or less large traces of heptasulfimide.

Hydrazine, known to be one of the most energetic reducing agents extant, has the added advantage of leaving no reaction residues since its decomposition products are nitrogen and hydrogen.

When hydrazine is caused to act on nitrogen sulfide in an organic solvent such as benzene or carbon tetrachloride, sheltered from water, the initially dark orange solution gradually discolors. Nitrogen and ammonia are liberated (which can be determined by classic methods) and there is a precipitation of sulfur. It is further possible to follow the formation of cycloheptasulfimide, which remains in solution, by infrared spectrography, by measuring the intensity of the characteristic band of the NH group in the wavelength region of 3340 cm.$^{-1}$. Total discoloration of the solution indicates the end of the reaction. Determination of the various products formed shows that the reaction probably takes place according to the following equation:

(3)    $2S_4N_4 + N_2H_4 \rightarrow NH_3 + 4N_2 + S + S_7NH$

The cycloheptasulfimide formed is separated by evaporating the clear solution obtained after filtering the reaction mixture. Well-formed crystals are obtained which have crystallized in the rhombohedral system, and these crystals have bipyramidal or orthorhombic shapes or take the form of slightly rhombohedral lamella. They melt at 113.5° C. and have a density of 1.992.

The same product can be obtained when thiotrithiazyl chloride is caused to react with hydrazine in the absence of hydrating water, in accordance with the following reaction equation:

(4)    $2S_4N_3Cl + 3N_2H_4 \rightarrow 2ClNH_4 + NH_3 + 4N_2 + S + S_7NH$

Ammonium chloride, which is insoluble in the organic solvent, precipitates with the sulfur and can therefore also be separated by filtration.

With regard to the solvents themselves, any solvent which is inert with respect to the reaction can be used. Benzene, cyclohexane and the solvents provided by chlorinated hydrocarbons, such as carbon tetrachloride, trichloroethylene, chloroform, and the like, are to be preferred because of the solubility of cycloheptasulfimide in such solvents.

The duration of the reaction is greater when it is based on thiotrithiazyl chloride, because this substance is only slightly soluble in the organic solvents considered. The duration of a reaction utilizing nitrogen sulfide will, however, be shorter since the latter is soluble in those same solvents. In the latter case, therefore, more intimate contact is ensured between the hydrazine and the nitrogen sulfide.

The method of preparing cycloheptasulfimide from thiotrithiazyl chloride, though slower, has the advantage of resulting in an end-product which is purer than when starting from the nitrogen sulfide. For assuming that the latter were prepared in accordance with the French patent application hereinbefore referred to, it would not be entirely free from impurities; yet these impurities are eliminated during the subsequent reaction of the nitrogen sulfide with sulfur chloride to form thiotrithiazyl chloride.

In these methods, the higher the temperature, the greater the reaction speed. On the other hand, the temperature cannot be raised to a great extent owing to the relatively low boiling points of some of the organic solvents and, above all, because of the fragility of the hydrazine and the cycloheptasulfimide formed, so that results become uncertain when the operating temperature exceeds 50° C. The preferred temperature range is between 45° C. and 50° C. approximately.

With more particular reference to hydrazine, it is well known that, for all practical purposes, the latter is commercially available only in the form of the monohydrate $N_2H_4, H_2O$, which contains only 54.5% of hydrazine. This monohydrate is unusable in its existing form owing to the sensitivity of the reaction products to alkaline hydrolysis.

This drawback can be advantageously overcome by proceeding in accordance with the second provision of the invention, by causing the hydrazine hydrate to be adsorbed on a porous support such as an activated silica gel which is subsequently capable of liberating the hydrazine in the midst of the reaction mixture in which the hydrazine must operate, the hydrating water of the initial hydrazine hydrate being retained in said porous support. The silica gel utilized for this operation should preferably be of granular form.

The hydrazine-retaining granules obtained thus are introduced into the solvent containing the nitrogen sulfide $S_4N_4$ in solution or the thiotrithiazyl chloride in suspension. It will be noted that the hydrazine introduced into the reaction medium referred to fully retains its reducing capacity, since it is possible to observe the aforementioned liberations of nitrogen and ammonia and the formation of cycloheptasulfimide, which may be monitored by infrared spectrography as stated precedingly.

Said silica gel granules may retain 16–17% or more of hydrazine in their structure. The use of silica gel granules containing larger concentrations of hydrazine will be found less advantageous, as the granules then tend to become sticky and consequently difficult to use.

Conversely, granules with hydrazine contents of less than 16–17% assume the form of dry granules that can be preserved indefinitely. The advantages of this method of utilizing hydrazine will readily be appreciated. Hydrazine-charged granules obtained in accordance with the present invention could therefore be used for reducing, in an organic solvent, compounds other than nitrogen sulfide $S_4N_4$ or thiotrithiazyl chloride. The invention permits in particular of utilizing hydrazine, even if it has been initially hydrated, for reducing, in an inert organic solvent, any water sensitive compound that is readily hydrolyzable or capable of furnishing readily hydrolyzable reduction compounds.

By way of non-limitative example, it is possible to obtain silica gel granules containing from 10 to 13.5% of hydrazine by proceeding as follows:

The first step is to prepare, in the manner well known per se, a silica gel which is activated by neutralizing a sodium silicate with hydrochloric acid having a concentration of 23° Baumé. The end-of-neutralization indicator could be methyl orange, for instance. The gelatinous silica percipitate formed is allowed to rest for about ten hours, then washed several times with distilled water, after which it is dried at 120° C. and finally roasted at 300° C. The still-hot roasted gel is then dipped and washed several times in hot distilled water to eliminate the sodium salts coexisting with the silica gel, and this is continued until the washing water gives no further precipitate when silver nitrate is added. The gel obtained thus is finally dried at 400° C.

This gel is granulated and placed in a rotating cylindrical container which is cooled energetically by means of a stream of cold water. Hydrazine monohydrate is then added to this gel slowly until a proportion of 25 cubic centimeters of hydrazine monohydrate per 75 grams of activated silica gel is obtained. Since this adsorption process causes considerable heat to be given off, the cylindrical container must be cooled very energetically. Dry grains containing the reducing agent are thus ultimately obtained and can be preserved in carefully sealed flasks possibly made of coloured glass, and these granules can be stored indefinitely as they are if they are sheltered from dampness.

By way of indication, the concentration of basic hydrazine $N_2H_4$ in the activated silica gel granules can be determined by a colorimetric method consisting in placing the granules in contact with a solution of p-dimethylaminobenzaldehyde in a slightly acid medium. This causes a bright orange diazo dye to form, the optical density of which is then measured with a photometer and compared with a calibration curve plotted previously by means of solutions prepared from pure crystallized hydrazine dichlorohydate.

Whilst the invention will have been rendered sufficiently clear from the foregoing, it is proposed to give hereinbelow two examples of the preparation of cycloheptasulfimide involving the precedingly described provisions of the invention.

Example 1

Three grams of crystallized nitrogen sulfide $S_4N_4$ are dissolved in 300 ml. of a bezene solution contained in a 500 ml. Erlenmeyer equipped with a reflux condenser. The formation of a dark orange colored solution may be observed. Ten grams of activated silica granules containing 12% of base hydrazine and prepared as hereinbefore described are added to this solution. The reaction starts immediately and is revealed by an abundant liberation of gas and a heating up of the solution. Care is exercized to keep the reaction medium at a temperature of about 46° C. for eight to ten hours. The reaction is complete when the solution becomes absolutely colorless. The stages in this reaction can also be followed by measuring the intensity of absorption in the wavelength band in the region of 3340 cm.$^{-1}$, characteristic of the NH radical. The mixture is then filtered and the clear solution purified by passing it over a thin layer of neutral activated alumina, the solution being finally evaporated to give crystals which, in solution reveal the infrared spectrum characteristic of cycloheptasulfimide and which possess the physical properties referred to previously. The quantity of pure substance obtained is 1.845 grams, corresponding to a yield of 96% with respect to the weight of the starting nitrogen sulfide.

Example 2

Eight grams of thiotrithiazyl chloride are introduced into 300 ml. of carbon tetrachloride, in the same apparatus as before, and 30.5 grams of activated silica granules retaining 10.28% of base hydrazine in adsorbed form are added to the reaction medium. The temperature is maintained at about 46° C. The start of the reaction is revealed by an abundant liberation of nitrogen and ammonia and by the dark red coloring of the solvent, due probably to the initial decomposition of the thiotrithiazyl chloride into nitrogen sulfide. Here again, the end of the reaction is indicated when the solution becomes absolutely colorless, the reaction lasting five to six days. The cycloheptasulfimide crystals are obtained from the clear solution by the same method as that of Example 1, the yield being 3.150 grams of pure cycloheptasulfimide, corresponding to an efficiency of 67.6%.

In both these experiments the product obtained takes the form of white crystals shaped as rhombohedral prisms. They melt at 113.5° C. and decompose in the process, and their density is 1.992. A gravimetric analysis of this product also bears out the formula $S_7NH$:

Predicted percentage: N, 5.85; S, 93.72; H, 0.43. Actual percentage: N, 5.92; S, 92.92; H, 0.56.

The infrared spectrum of the pure product in solution in carbon disulfide in a tank 0.3 mm. thick gives two typical, vary intense bands at 3335 cm.$^{-1}$ and 807 cm.$^{-1}$, which correspond to the NH$^-$ group and the SN bond, respectively.

It goes without saying that the invention is by no means limited to the specific applications or forms of embodi-embodiment thereof more particularly described hereinabove, but that many changes and substitutions may be made without departing from its scope as defined in the claims.

What I claim is:

1. A process for preparing cycloheptasulfimide which comprises reacting a compound selected from the group consisting of nitrogen sulfide and a thiotrithiazyl halide with a hydrazine reactant in an organic inert solvent for the said cycloheptasulfimide sheltered from water.

2. A process according to claim 1 wherein said thiotrithiazyl halide is thiotrithiazyl chloride.

3. A process according to claim 1 wherein said reaction is carried out at a temperature ranging from 45° to 50° C.

4. A process according to claim 1 wherein said hydrazine reactant consists of an hydrazine hydrate absorbed on activated silica gel.

References Cited

FOREIGN PATENTS 1,060,851  7/1959  Germany.

OSCAR R. VERTIZ, Primary Examiner.

HOKE S. MILLER, Assistant Examiner.

U.S. Cl. X.R.

252—188